Aug. 31, 1965 P. GEIBEL ETAL 3,203,205
CLUTCH DISC ARRANGEMENT
Filed Aug. 17, 1962

United States Patent Office 3,203,205
Patented Aug. 31, 1965

3,203,205
CLUTCH DISC ARRANGEMENT
Peter Geibel and Gustav Schneider, Schweinfurt (Main),
Germany, assignors to Firma Fichtel & Sachs Aktiengesellschaft, Schweinfurt (Main), Germany
Filed Aug. 17, 1962, Ser. No. 217,635
Claims priority, application Germany, Aug. 19, 1961,
F 20,724/47
3 Claims. (Cl. 64—27)

The invention relates to a clutch disc arrangement with internally mounted oscillation damping means, especially for frictional clutches. Frictional clutches with internally mounted oscillation damping means are well-known.

All the known frictional clutches with internally mounted oscillation damping means suffer however from the disadvantage that the friction faces effecting the oscillation damping are very small and have therefore only short life.

The object of this invention is to provide an improved clutch disc arrangement in which said oscillation damping means are made up by relatively large friction faces so that there is a highly effective damping and that the life of these friction faces is prolonged.

The invention starts from a clutch disc arrangement comprising a clutch hub, a clutch disc rotatably mounted on said clutch hub, elastic torque transmission means between said clutch hub and said clutch disc, and oscillation damping frictional means between said clutch disc and said clutch hub.

In accordance with this invention there are provided annular guide discs on said clutch hub; said annular guide discs are mounted on said clutch hub non-rotatably but axially movable with respect to one another and are biased in approaching direction by tensioning means; between said annular guide discs there is housed the radially inner zone of the annular clutch disc and between at least one of said annular guide discs and said clutch disc there is provided an annular friction disc; the torque transmission means in this arrangement engages said clutch disc on the one hand and said annular guide discs on the other hand.

There may be annular friction discs between both of said annular guide discs and said clutch disc in order to provide a more effective friction between said clutch disc and said clutch hub and thus a more effective oscillation damping effect.

In a preferred embodiment of the invention there are provided windows in the annular guide discs, the friction discs and the clutch disc; these windows receive helical compression springs. These helical compression springs are arranged in a peripheral position with respect to the axis of said clutch hub; they are guided by the windows of said annular guide discs and abut with their peripheral ends the edges of the windows, of the clutch disc and of the guide discs.

The arrangement in accordance with this invention becomes very simple by making one of said annular guide discs immovably fixed on said clutch hub, e.g., by rivets and mounting the other guide disc non-rotatably but axially movably on said clutch hub by means of engaging teeth of said guide disc and said clutch hub; the tensioning means can be made up in such an arrangement by finger-like leaf springs fixed with their radially inner ends on the clutch hub and acting with their radially outer ends on said axially movable annular guide disc.

Figure 1:
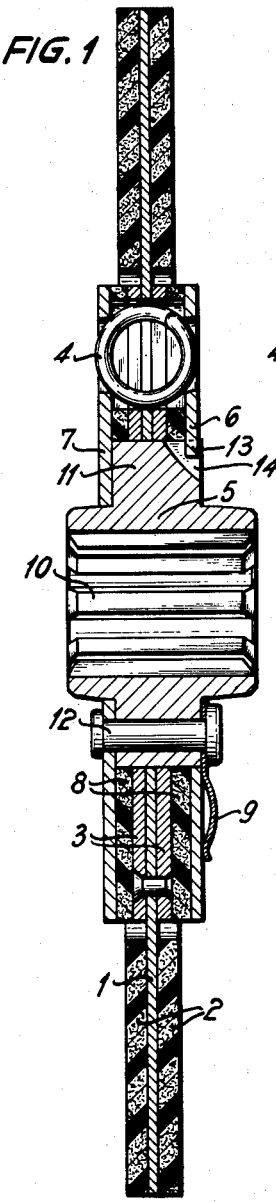
FIGURE 1 shows an axial section of a clutch disc arrangement in accordance with this invention (section along line I—I of FIG. 2).

In FIGURE 1 one finds a clutch hub 5 with a mounting flange 11. On this mounting flange 11 there is fixed a guide disc 7 by means of rivets 12. Another annular guide disc 6 is equally mounted on said mounting flange 11; it is axially movable with respect to the mounting flange 11 but non-rotatable with respect to this mounting flange 11 due to engaging teeth 13, 14 on the annular guide disc 6 and on the clutch hub 5, respectively.

Between the annular guide discs 6 and 7 there is received the radially inner zone of a clutch disc 1 bearing on its radially outer zone clutch friction coatings 2. In its radially inner zone clutch disc 1 is reinforced by reinforcing rings 3 mounted to the clutch disc 1 by rivets. Between each of said reinforcing rings 3 and each of said annular guide discs 6 and 7 there are provided frictional discs 8. The frictional discs 8 may be made up of any material; e.g., they may be metallic or ceramic. On clutch hub 5 there are fixed by means of rivets fingerlike leaf springs 9 which act with their radially outer ends onto the axially movable annular guide disc 6 so that the staple of discs 6, 7, 8, 3 and 1 is pressed together by said leaf springs 9.

Figure 2:
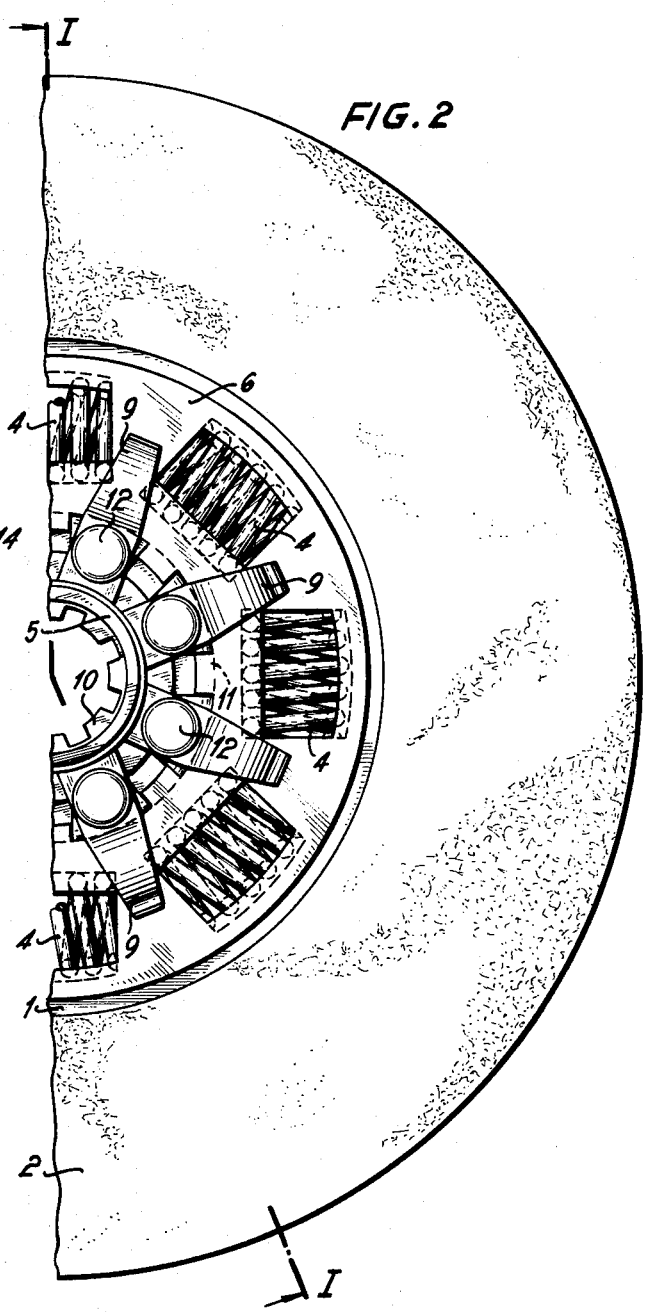
FIGURE 2 shows an end view of a clutch disc arrangement in accordance with this invention.

As can be best seen from FIG. 2 there are windows cut into guide discs 6, 7, clutch friction discs 8, reinforcing rings 3 and clutch disc 1. Each of these windows receives a helical compression spring 4 in a peripheral position with respect to the axis of said clutch hub 5. The windows in the guide discs 6 and 7 are shaped so as to position the helical compression springs 4 within the clutch disc arrangement. The ends of the helical compression springs 4 abut with the edges of said windows in the guide discs 6 and 7 and abut also the edges in the windows of the clutch disc 1 and in the reinforcing rings 3.

In operation the clutch hub 5 is mounted on a shaft (not illustrated) and is non-rotatably connected to said shaft, e.g. by means of splines. When the clutch is operated at least one of the frictional coatings 2 are brought into frictional contact with a similar frictional coating of a driven member. When this contact is accomplished a torque is transmitted by the clutch disc arrangement. This torque transmission is achieved due to the helical compression springs 4 which are compressed by the transmitted torque to a certain degree. The compression of the helical springs is accompanied by an angular movement of the clutch disc 1 with respect to clutch hub 5. This angular movement is damped by means of friction discs 8 which engage under pressure the guide discs 6, 7 on one hand and the reinforcing rings 3 on the other hand.

As can be seen from FIG. 1 the friction discs 8 extend in radial direction over the whole radial dimension of the guide discs 6 and 7. The friction discs 8 are only interrupted by the windows receiving the helical compression springs 4. So it is achieved that there are large frictional faces for the damping means; the damping of oscillation is very effective and the life of the frictional face is long.

The clutch disc arrangement in accordance with this invention can be employed in every field where friction clutches are used, especially they are suitable for clutches in cars.

We claim:

1. A clutch disc arrangement comprising a hub, a clutch disc rotatable on said hub, two annular guide discs non-rotatably secured to opposite sides of said hub for axial displacement of one of said guide discs towards the other guide disc, spring means resiliently forcing at least one of said guide discs towards said clutch disc, vibration dampening discs disposed between said clutch disc and said guide discs and extending radially substantially from said hub to the outer periphery of said guide discs, said clutch disc, vibration dampening discs, and guide discs having substantially aligned apertures, and coil springs positioned in each group of said aligned apertures transmitting torque from said clutch disc to said vibration dampening discs and guide discs.

2. A clutch disc arrangement as claimed in claim 1 wherein said spring means is a plurality of finger-like leaf springs mounted with their inner ends on said hub and pressing with their outer ends against said axially movable guide disc.

3. A clutch disc arrangement as claimed in claim 1 comprising teeth at the periphery of said hub, and teeth at one of said guide discs engaging said hub teeth so as to allow axial displacement of said guide disc.

References Cited by the Examiner
UNITED STATES PATENTS

| | | |
|---|---|---|
| 1,896,914 | 2/33 | Paton. |
| 2,042,570 | 7/36 | Wemp. |
| 2,183,130 | 12/38 | Binder. |
| 2,314,948 | 3/43 | Nutt. |
| 2,364,988 | 12/44 | McFarland. |
| 2,853,862 | 9/58 | Thelander. |

ROBERT C. RIORDON, *Primary Examiner.*